United States Patent [19]

Pohjola

[11] 4,188,076
[45] * Feb. 12, 1980

[54] ENDLESS BELT AND ROLL ASSEMBLY FOR VEHICLES OR CONVEYERS

[76] Inventor: Jorma Pohjola, Haravatie 6, 90530 Oulu 53, Finland

[*] Notice: The portion of the term of this patent subsequent to Oct. 10, 1995, has been disclaimed.

[21] Appl. No.: 809,453

[22] Filed: Jun. 23, 1977

[30] Foreign Application Priority Data

Jun. 24, 1976 [FI] Finland .................................. 761865

[51] Int. Cl.² .......................................... B65D 55/24
[52] U.S. Cl. ................ 305/29; 305/35 EB; 305/44
[58] Field of Search ............. 305/35 EB, 35 R, 36, 305/38, 44, 23, 29; 198/831

[56] References Cited

U.S. PATENT DOCUMENTS

| | | | |
|---|---|---|---|
| 3,023,824 | 3/1962 | Bombardier | 305/23 X |
| 3,788,455 | 1/1974 | Dieckmann | 198/831 |
| 3,934,664 | 1/1976 | Pohjola | 305/44 X |
| 4,023,865 | 5/1977 | Morissette | 305/35 EB |
| 4,119,356 | 10/1978 | Pohjola | 305/44 X |

*Primary Examiner*—David A. Scherbel
*Attorney, Agent, or Firm*—Steinberg & Blake

[57] ABSTRACT

A vehicle or a conveyer has a pair of rolls which are spaced from each other and provided with central axes of rotation situated in a given common plane. An endless belt extends between and is guided around these rolls with this belt having on opposite sides of the above plane a pair of runs which respectively travel in opposite directions during rotation of the pair of rolls. This endless belt has a pair of opposed endless side edge regions and midway between the latter an elongated endless central region which is flexible but substantially non-stretchable. Between the central region and each of its side edge regions the endless belt has a lateral endless elastic portion which is capable of stretching and contracting longitudinally.

9 Claims, 10 Drawing Figures

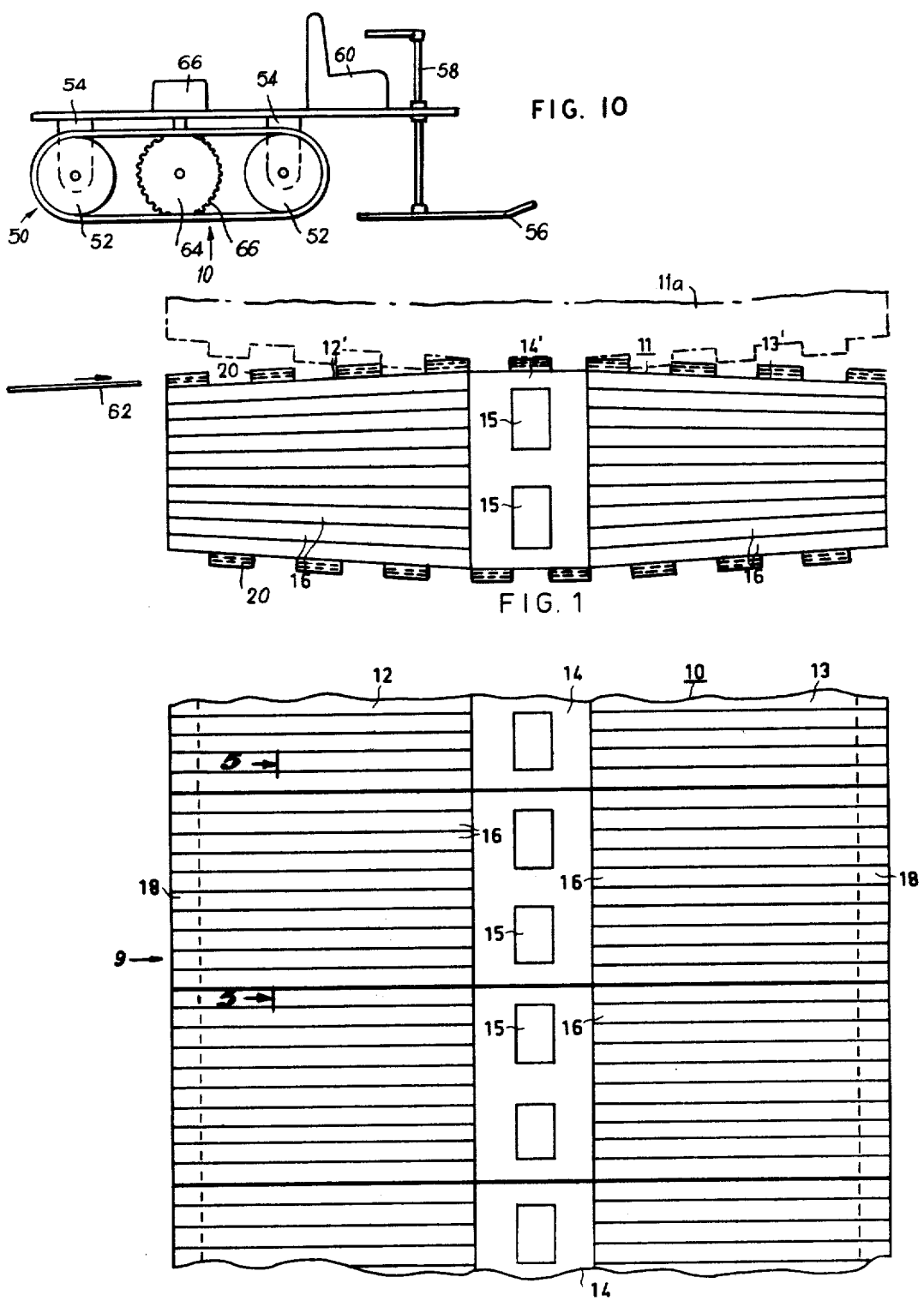
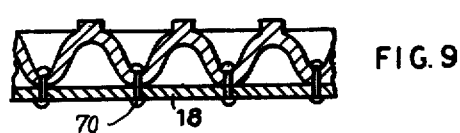

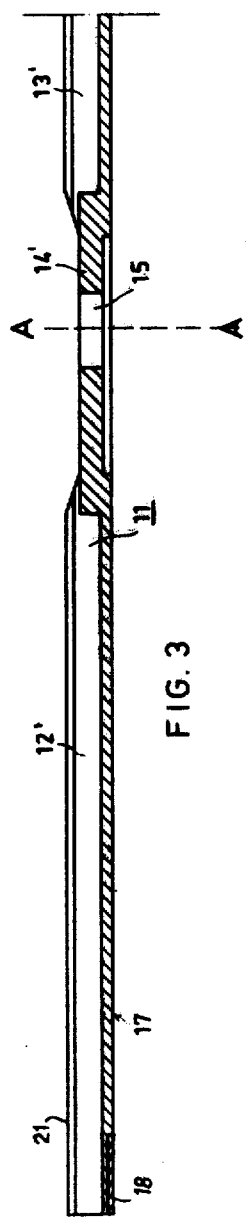
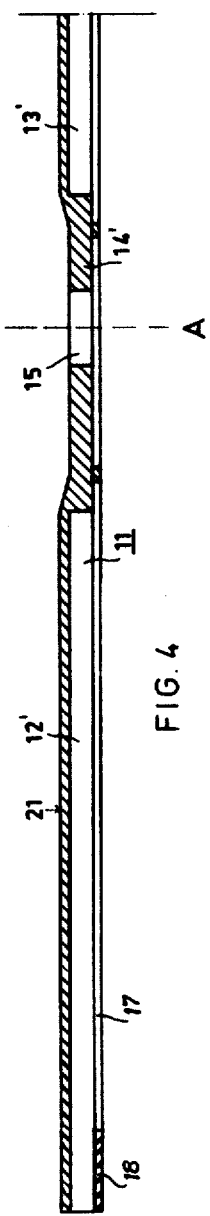
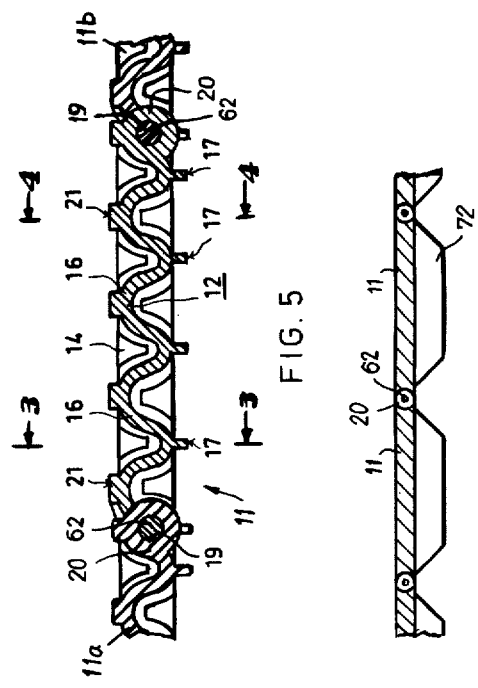
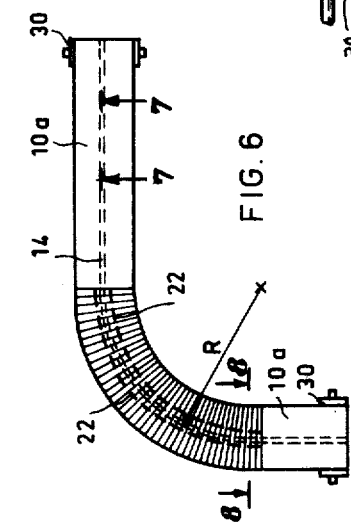
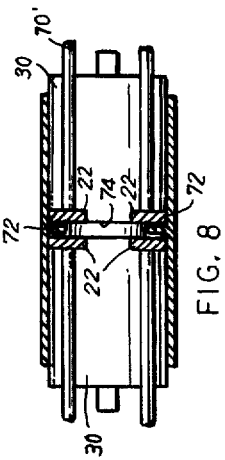

ENDLESS BELT AND ROLL ASSEMBLY FOR VEHICLES OR CONVEYERS

BACKGROUND OF THE INVENTION

The present invention relates to endless belt and roll assemblies of the type which are used in vehicles and conveyers. Thus, in such constructions the endless belt extends between and is guided around the pair of rolls. Such an endless belt may be made up of a series of interconnected elements or may be in the form of a continuous sheet material.

Assemblies of the above type are already known in connection with vehicles which are of the endless track type, such vehicles generally having one roll such as a front roll which is capable of swivelling about an upright axis for the purpose of steering the vehicle. In this connection reference may be made to Finnish Pat. Nos. 48,814 and 50,498. With such constructions when one of the rolls around which the endless belt extends is turned about an upright axis, for steering the vehicle, the endless belt contracts on one side and lengthens on the opposite side while the vehicle executes a turn. Thus, such an endless belt is capable of assuming a curved configuration when the vehicle turns.

Such an endless belt or track generally has a central endless band or equivalent reinforcing or stiffening structure which extends in the direction of travel of the vehicle and which is capable of bending substantially according to the curvature required by the turning radius of the vehicle, this central band or the equivalent thereof being substantially non-stretchable in a longitudinal direction. However, on both sides of this central band the endless belt or track has areas which are capable of stretching or contracting and which are of an accordion or wavy-shaped configuration.

In vehicles of the above type where a roll around which the endless belt or track is guided is capable of swivelling about an upright axis, the curving of the endless belt or track requires the latter to have certain properties.

SUMMARY OF THE INVENTION

It is a primary object of the present invention to provide a roll and endless belt assembly which is particularly adapted for use under conditions where the rolls which guide the endless belt are not required for steering purposes and do not require a roll which must swivel about an upright axis.

Thus it is an object of the present invention to provide a roll and endless track assembly capable of being used in vehicles where the rolls have axes which remain fixed with respect to the vehicle.

Also it is an object of the present invention to provide a roll and endless belt assembly capable of being used in a conveyer not only where the rolls have parallel axes but also under conditions where the axes of the rolls are not necessarily parallel and where the belt can travel along a path which at least partially is curved.

In particular it is an object of the present invention to provide a construction of this latter type where the radius of curvature may be rendered adjustable for the purpose of making it possible for one conveyer to move goods between different points of departure and/or arrival.

It is a more particular object of the present invention to provide an endless track and roll structure capable of being used on a vehicle such as a snowmobile where steering is achieved by way of a ski, while an endless track partially supports the vehicle for travelling movement and is guided around rolls which are fixed with respect to the vehicle.

It is a further object of the present invention to provide an endless track or belt of the above type which is exceedingly durable and has operating characteristics superior to previously known belts or tracks which have been used for similar purposes.

It is accordingly a general object of the invention to provide an endless belt or track superior to previously known constructions of this type with respect to the durability of the belt or track and its operating characteristics which enable the structure of the invention to be utilized for the most varied purposes.

According to the invention a structure which has a pair of rolls means provided with central axes of rotation which remain fixed with respect to each other also has an endless belt means guided around and extending between this pair of roll means. The axes of the pair of roll means are situated in a common plane on opposite sides of which the belt means has a pair of runs which respectively travel in opposite directions during rotation of the pair of roll means. This endless belt means has a pair of opposed endless side edge regions and midway between the latter an endless central region which is flexible but substantially non-stretchable. Between this central region and each of its side edge regions the endless belt means has an endless longitudinal elastic portion capable of stretching and contracting in a springy manner.

BRIEF DESCRIPTION OF DRAWINGS

The invention is illustrated by way of example in the accompanying drawings which form part of this application and in which:

FIG. 1 illustrates one of a number of identical elements which can be assembled together to form an endless belt or track of the invention, FIG. 1 showing in phantom lines part of an adjoining element which is to be connected with the element shown in FIG. 1;

FIG. 2 fragmentarily illustrates in a schematic manner how a series of the elements of FIG. 1 are joined together to form an endless belt or track;

FIG. 3 is a fragmentary transverse section of an endless belt or track of the invention taken along line 3—3 of FIG. 5 in the direction of the arrows;

FIG. 4 is a fragmentary transverse section of an endless belt or track of the invention taken along line 4—4 of FIG. 5 in the direction of the arrows;

FIG. 5 is a fragmentary longitudinal section of an endless belt or track of the invention taken along line 5—5 of FIG. 2 in the direction of the arrows;

FIG. 6 is a schematic elevation of how the endless belt means of the invention is used in a conveyer;

FIG. 7 is a schematic fragmentary longitudinal section of the structure of FIG. 6 taken along line 7—7 of FIG. 6 in the direction of the arrows;

FIG. 8 is a schematic transverse section of part of the structure of FIG. 6 taken along line 8—8 of FIG. 6 in the direction of the arrows;

FIG. 9 is a fragmentary side elevation of part of the structure of FIG. 2 taken in the direction of the arrow 9 of FIG. 2; and FIG. 10 is a schematic side elevation of a snowmobile which includes the structure of the invention.

DESCRIPTION OF PREFERRED EMBODIMENTS

The endless belt means 10 of the invention may be used, for example, in a vehicle such as a snowmobile 50 which is schematically shown in FIG. 10, or the endless belt means may be used in a conveyer, as shown in FIG. 6 where the endless belt means 10a is indicated. Thus, in the case of a snowmobile 50 the endless belt means is guided around a pair of roll means 52 which have parallel axes which remain fixed with respect to each other, the pair of roll means 52 being supported by suitable frame parts 54 of the vehicle 50 so that the pair of roll means 52 are capable of rotating about their parallel axes. The vehicle 50 has a ski 56 which through a suitable structure 58 can be turned by an operator on the seat 60 for steering purposes.

As is apparent from FIGS. 1 and 2, the endless belt means 10 is made up of a series of identical belt elements 11 which are connected one with the next in a known way so as to form an endless belt means 10 which may be utilized as shown in FIG. 10. Thus, the element 11 is provided along one transverse edge with a plurality of projections 20 formed with bores passing therethrough parallel to the transverse edge of the element 11. At the opposite transverse edge the element 11 also has projections 20 formed with bores passing therethrough parallel to the opposed transverse edge and it will be noted that these projections 20 at one transverse edge are in line with the gaps between the projections 20 at the opposite transverse edge. Thus, as is shown in phantom lines in FIG. 1, the element 11a which is identical to the element 11 and situated next to the same will have the projections 20 at one of its transverse edges received in the gaps between the projections 20 of the next element 11, and a wire or rod 62 can be passed through the aligned bores of the interdigitated projections so as to connect one element to the next. Thus, in this way a series of identical elements 11 can be joined together to form an endless belt means 10 wherein each element is capable of turning about the rod 62 with respect to the adjoining elements. Of course, if desired, the endless belt means may be made of a continuous endless belt or of a plurality of such endless belts.

A portion of the endless belt means 10 is shown in FIGS. 2–5 with FIG. 2 schematically indicating a series of interconnected identical belt elements 11, FIG. 5 shows how the aligned bores 19 of the projections 20 receive the rod or wire 62 for pivotally interconnecting a given element 11 with a pair of adjoining elements 11a and 11b, the latter adjoining elements being fragmentarily indicated in FIG. 5.

As is apparent from FIGS. 1–4, the endless belt means 10 has a pair of opposed endless side edge regions and midway between the latter an elongated endless central region 14 made up of the consecutive central portions 14' of the several identical belt elements 11. These consecutive portions 14' which thus cooperate to form the central endless region 14 are flexible but substantially non-stretchable. As is shown in FIGS. 3 and 4, the portions 14' are bisected by a central plane A—A. Between the endless central region 14 and the opposed side edge regions, which are also endless, the endless belt means has the endless lateral portions 12 and 13 made up of the successive lateral portions 12' and 13' of the several identical elements 11. These lateral portions 12 and 13 are capable of expanding and contracting longitudinally in a springy manner inasmuch as these portions are elastic. It will be noted that with respect to the central plane A—A, the endless belt means is symmetrical with the lateral elastic endless portions 12 and 13 being symmetrically arranged with respect to the central endless substantially non-stretchable portion 14. It is to be noted that the consecutive portions 14' which go to make up the endless portion 14 while being substantially non-stretchable nevertheless are of sufficient flexibility not only to curve around the axis of a roll such as one or the other of the rolls 52 of FIG. 10, but also so as to be capable of bending laterally so as to assume, for example, a curvature as illustrated along the radius R in FIG. 6 where the same elements 11 are assembled to form the endless belt means 10a.

For purposes such as use in a vehicle, the central endless portion 14 of the belt means 10 is provided with a means to cooperate with a drive means. In the illustrated example, this means is formed by portions of the central region 14 which are formed with the apertures 15 passing therethrough.

Thus, as is shown in FIG. 10 in a schematic manner, a suitable driving sprocket 64 is situated between the upper and lower runs of the endless belt means 10 which respectively travel in opposite directions on opposite sides of the plane which contains the axes of the pair of roll means 52 between and around which the endless belt means 10 extends. This drive component 64 is rotated from any suitable transmission or engine or the like 66, which is schematically represented in FIG. 10. The drive means 64 has driving projections 66 which extend into the apertures 15 for thus driving the belt means 10 in order to propel the vehicle 50, and it will be noted that the sprocket or drive means 64 serves not only for driving purposes but also to support the upper and lower runs of the endless belt means between the end rolls 52. Instead of apertures 15 and projections 66 on the drive means 64, it is also possible to utilize instead projections integral with the central endless region 14 and projecting inwardly to form a series of teeth arranged in a row along the inner surface of the endless belt means. In this case the drive 64 will take the form of a gear the teeth of which mesh with the teeth which are integral with the central region 14 of the endless belt means. With such a construction the rolls 52 would be formed midway between their ends with circumferential grooves through which the teeth of the endless belt means could freely pass. Thus the construction indicated in FIGS. 1 and 2 is preferred since by providing apertures 15 to cooperate with driving teeth it is unnecessary to form in the rolls 52 grooves for a purpose as referred to above.

The elements 11 which are assembled as set forth above to form the endless belt means of the invention may be made of a suitable plastic material, for example, which will provide the endless belt means with the central substantially non-stretchable but flexible region 14 and with the opposed lateral portions 12 and 13 which are elastic and capable of expanding and contracting. Thus, the several sections 11 may be made of a suitable elastic and wear-resistant plastic material such as polypropylene or a synthetic rubber such as a butadiene rubber. The lateral portions 12 and 13 are subjected to a suitable press treatment or are die-cast so as to be provided with a prestress of a given magnitude. Moreover, in addition to being provided with a given elastic prestress in the above-described manner, it is possible for the lateral portions 12' and 13' of the several sections 11 to be suitably heat-treated so that these portions 12' and 13' will retain the configuration illustrated in FIG. 1.

Thus with several elements 11 manufactured as set forth above a continuous endless belt 10 is assembled in the manner described above, and the completed belt means 10 is straight as indicated in FIG. 2, the belt means in this condition having the lateral portions 12 and 13 in a stretched condition so that in the straight condition shown in FIG. 2 the opposed edge regions of the endless belt means are internally prestressed to a given extent and tend to contract so that they elastically tend to assume a length shorter than that which is indicated at the opposed side edges in FIG. 2. Of course an equivalent internal stress condition is created in an endless belt means which consists only of a single endless sheet of material, as by providing a treatment as set forth above.

With such a construction when the endless belt means is used for a purpose as shown for the belt means 10a in FIG. 6, it is possible for the belt means to curve, for example along the radius R indicated in FIG. 6, without any "bagging", or in other words undesirable bulging at localized portions, at the inner side of the curve. The endless belt means will automatically contract along the inner side of the curve because of the internal prestress condition which becomes automatically reduced when the endless belt means assumes a curvature as indicated in FIG. 6, the extent to which the internal prestress is gradually reduced being the greater as the turn is sharper. The extent of internal stress is chosen in such a way that when a radius of curvature R as shown for the conveyor belt 10a of FIG. 6 is provided, there is still a minor internal stress remaining in the elements 11 which form the belt means 10a, along the inner side of the curve.

Preferably the lateral portions 12' and 13' of the several elements 11 are composed of a series of portions 16 which are curved in the manner shown most clearly in FIG. 5 so as to provide these portions 12' and 13' with the wavy or corrugated configuration, in cross section, apparent from FIG. 5. Such a corrugated configuration provides the advantage that it is possible very easily for the required deformation to take place uniformly throughout the lateral portions 12 and 13 of the endless belt. Thus with such a construction there will be no abrupt local deformation areas, which could easily lead to rupture of the endless belt means. Instead of the smoothly curved corrugated or wavy configuration shown in FIG. 5 it is also possible to have an accordian-shaped configuration or a sharper zig-zag configuration where the crests of the wavy portions are much sharper than in the construction shown in FIG. 5.

Furthermore, it is possible to provide as indicated in FIGS. 2 and 9 along the inner surface of the endless belt means at the opposed side edge regions thereof a pair of endless marginal band portions 18 which, for example, may be riveted to the edge regions, as by the rivets 70 indicated schematically in FIG. 9, and these endless marginal bands 18 are preferably made of an elastic material such as rubber. Their dimensions are such that they serve to limit the extent to which the belt means can expand at the opposed side edge regions thereof.

While with the above embodiment of FIGS. 1-5, when using the same for a purpose as shown in FIG. 10 it is possible to provide a drive means cooperating with the apertures 15, it is also possible to use suitable wheels cooperating with the same apertures 15 as supporting or spring-suspension wheels as well as other equivalent supporting wheels for bracing skis or runners which engage the inner surface of the endless belt means at its upper and/or lower run. Because of the reversible elasticity and possible prestressing of the endless belt means of the invention, this belt means can be utilized for a vehicle of the type shown in FIG. 10 in a manner which will better adapt such a vehicle for use on many different types of terrain with the belt means of the invention being capable of effectively adapting itself to obstacles without being susceptible to damage by such obstacles as was the case with previously known endless belt means.

As is particularly apparent from FIGS. 3-5, it is preferred to provide the curved portions 16 with integral ribs 21 extending longitudinally along the portions 16 and situated at the inner side of the endless belt means. Thus, if FIG. 5 is considered as illustrating a lower run of an endless belt means 10 utilized in the manner indicated in FIG. 10, for example, then the ribs 21 will be directed upwardly away from the terrain along the lower run of the belt means. The outer side of the belt is provided at the crests of the curved portion 16 with integral ribs 17 indicated in FIG. 5, and at the lower run it is these ribs which will engage the surface along which the vehicle travels. Thus in the example shown in FIG. 5, the inner ribs 21 are considerably wider than the outer ribs 17. These ribs or projections 17 will assure a secure grip between the endless belt means and the surface along which it travels.

As has been indicated above, FIG. 5 indicates the bores 19 of the projections 20, and of course the wires or connecting rods 62 are situated in the aligned bores 19.

FIGS. 6-8 illustrate how the endless belt means of the invention may be used in a conveyer. As is indicated in FIG. 6, a pair of roll means 30 are provided, but in this case the central axes of the pair of roll means 30 about which the latter rotate, are not parallel to each other although they remain with respect to each other in the fixed relation shown in FIG. 6. Thus in the case of FIG. 6 also the endless belt means 10a extends between and is guided around the pair of roll means 30 while having opposed runs which respectively travel in opposite directions on opposite sides of the plane which is common to and contains the axes of the rolls 30. Between the rolls 30 the endless belt means 10a of course changes its direction, curving along the radius R which is indicated in FIG. 6. For this purpose a pair of curved guides 22 are arranged along the upper run, and an additional pair of curved guides are arranged along the lower run of the endless belt means 10a. As is indicated in FIG. 8, the pairs of guides 22 are in the form of suitable rails which define a curved gap between themselves and which are supported by any suitable supporting bars 70' or the like forming part of the same structure which also supports the pair of rolls 30 for rotation about their axes. In this embodiment the several sections 11, some of which are schematically indicated in FIG. 7 are provided along their central substantially non-stretchable regions 14' with elongated projections 72 which have substantially the trapezoidal configuration indicated in FIG. 7, these projections 72 being integral with the central portions 14' of each element 11. Thus, these projections 72 will be received between the upper pair of guide rails 22, at the upper run of the endless belt means and between the lower pair of guide rails 22 at the lower run of the endless belt means, in the manner indicated in FIG. 8, and since these rails 22 are curved as indicated in FIG. 6, they will cooperate with the projections 72 in order to curve the endless belt means in the manner indicated in FIG. 6, along the radius R. It will be noted from FIG. 8 that each of the rolls 30 is provided with a circumferential groove 74 through which the projections 72 can freely pass.

Instead of providing a structure as described above and shown in FIGS. 6–8, it is also possible to utilize for the conveyor belt an endless belt means as shown in FIGS. 1–4 where the central region 14 is formed with the apertures 15. In such a case there will be situated between the upper and lower runs of the endless belt means a series of sprockets each of which is similar to the sprocket 64, with the teeth 66 of these sprockets engaging the apertures 15 and of course these sprockets also will serve to support the belt at its upper and lower runs. The series of sprockets are arranged in a row along the curve which has the radius R, so that in this way the teeth of the sprockets by entering into the apertures 15 will compel the belt means to curve along the radius R.

In connection with FIG. 6 it is of course possible to change the location of one or the other or both rolls 30, as well as to provide guides 22 of a different curvature, if necessary, so as to be capable of picking up and/or delivering goods from and to different locations.

Of course, the invention is not to be narrowly confined to embodiments described above and shown in the drawings only by way of example. The various details may of course vary within the scope of the inventive concept defined by the claims which follow below.

What is claimed is:

1. In a structure such as a vehicle or conveyer, a pair of roll means which are spaced from each other and which have central axes of rotation, respectively, situated in a given common plane and fixed with respect to each other, and endless belt means extending between and guided around said pair of roll means and having on opposite sides of said plane, respectively, a pair of runs which respectively travel in opposite directions between said roll means during rotation of the latter, said endless belt means having opposed endless side edge regions and midway between the latter an endless elongated central region which is flexible but substantially non-stretchable while between said central substantially non-stretchable region and each of said side edge regions said endless belt means has an endless lateral elastic portion capable of stretching and contracting longitudinally, each of said edge regions being in a stretched condition tending to contract upon itself when having a length approximately equal to that of said central region.

2. The combination of claim 1 and wherein said endless central region of said belt means has a means for cooperating with a driving member, supporting member, or the like.

3. The combination of claim 2 and wherein said means for cooperating with said driving member, supporting member or the like includes portions of said central region which are formed with apertures.

4. The combination of claim 2 and wherein said means for cooperating with driving members, supporting members or the like includes a series of projections integral with and projecting from said central region.

5. The combination of claim 1 and wherein each of said lateral portions has a wavy, corrugated configuration and includes crests situated alternately at opposed faces of said endless belt means and extending laterally from said central region to each of said edge regions of said endless belt means.

6. The combination of claim 1 and wherein said endless belt means is made up of a series of identical elements extending transversely across said endless belt means and joined one to the next.

7. The combination of claim 6 and wherein each of said identical elements terminates in opposed transversely extending ends provided with joint projections which are interdigitated with the joint projection of the next identical element.

8. The combination of claim 1 and wherein said axes of said pair of roll means are parallel to each other.

9. The combination of claim 1 and wherein said axes of said pair of roll means have a non-parallel relationship with respect to each other, said belt means having at said central region thereof a series of projections, and curved guide means situated between said pair of roll means along the path of travel of said runs of said endless belt means and cooperating with said projections for guiding said endless belt means along a predetermined curved path while travelling between said pair of roll means.

* * * * *